United States Patent [19]

Sharif-Askary

[11] Patent Number: 5,729,733
[45] Date of Patent: Mar. 17, 1998

[54] METHOD OF OPERATING A DISTRIBUTED DATABSE BASED ON OBJECT OWNERSHIP AND TRANSACTION CLASSIFICATION UTILIZING AN AGGRESSIVE REVERSE ONE PHASE COMMIT PROTOCOL

[75] Inventor: Jamshid Sharif-Askary, Palm Bay, Fla.

[73] Assignee: Harris Corporation, Melbourne, Fla.

[21] Appl. No.: 435,872

[22] Filed: May 5, 1995

[51] Int. Cl.$^6$ .................................................. G06F 17/30
[52] U.S. Cl. .................................... 395/608; 395/610
[58] Field of Search ................................ 395/600, 180, 395/181, 608, 610; 364/737

[56] References Cited

U.S. PATENT DOCUMENTS

| | | | |
|---|---|---|---|
| 4,503,535 | 3/1985 | Budde et al. | 371/11 |
| 4,570,261 | 2/1986 | Maher | 371/16 |
| 4,633,467 | 12/1986 | Abel et al. | 371/16 |
| 4,648,031 | 3/1987 | Jenner | 364/200 |
| 4,665,520 | 5/1987 | Strom et al. | 371/7 |
| 4,821,175 | 4/1989 | Hikita et al. | 364/200 |
| 5,140,689 | 8/1992 | Kobayashi | 395/575 |
| 5,247,664 | 9/1993 | Thompson et al. | 395/600 |
| 5,261,089 | 11/1993 | Coleman et al. | 395/600 |
| 5,280,612 | 1/1994 | Lorie et al. | 395/600 |
| 5,291,594 | 3/1994 | Sekigushi et al. | 395/600 |
| 5,333,314 | 7/1994 | Masai et al. | 395/600 |
| 5,452,445 | 9/1995 | Hallmark et al. | 395/600 |
| 5,553,280 | 9/1996 | Fortier | 395/600 |
| 5,561,797 | 10/1996 | Gilles et al. | 395/600 |
| 5,581,750 | 12/1996 | Haderle et al. | 395/618 |

*Primary Examiner*—Thomas G. Black
*Assistant Examiner*—Jean M. Corriélus
*Attorney, Agent, or Firm*—Rogers & Killeen

[57] ABSTRACT

A method of maintaining a distributed database among independently operable sites in which database availability is not interrupted during database update. Commands are provided to each of the sites and the database is assumed to be updated unless otherwise indicated by responses from the sites. Site operation continues whether a command has been executed properly or improperly or not at all, and commands are subsequently repeated until executed properly at all sites. Commands for acting on data in the database are classified by selected characteristics, and may be executed by class to facilitate exploitation of the data in the database. The method is disclosed in an electrical power distribution system in which data in a distributed database is used at plural independently operable command centers for the operation thereof.

28 Claims, 9 Drawing Sheets

PODB Update initiated by Sharing site

PODB Update initiated by Coordinating site

FIG. 11

PODB Update initiated by Sharing site

FIG. 12

Point change propogation on a point owned by SDN.

METHOD OF OPERATING A DISTRIBUTED DATABSE BASED ON OBJECT OWNERSHIP AND TRANSACTION CLASSIFICATION UTILIZING AN AGGRESSIVE REVERSE ONE PHASE COMMIT PROTOCOL

BACKGROUND OF THE INVENTION

The present invention is directed to a method of operating a distributed database, and more particularly to a "shoot first and ask questions later" method of updating data in a distributed database residing in plural independently operable local database sites.

Distributed databases are generally known, and include a plurality of sites, each of which includes a copy of the complete database (or at least as much of the database as the site will need). A distributed database may use a variety of data distribution methods, such as a local or wide area network, a fiber distributed data interchange, and the like. The sites may have different capabilities and may include one or more nodes for accessing and controlling the database that may be tailored for specific functions.

In conventional distributed database systems, an application program specifies transactions that are to be carried out against data, and accesses various resources within the system to execute the transactions. A resource manager is a subsystem that manages a portion of the system's resources. Application programs may request access to a resource manager to accomplish their transactions. A transaction manager is responsible for management and coordination of transactions that access resources in various parts of the system, and requests the assistance from resource managers. The interactions among application programs, resource managers, and transaction managers are client-server in nature.

In such conventional systems, a site may be responsible for updating a portion of the database, and may do so by providing updates to each of the other sites. When updating the database, a site sends a command for acting on the data to each of the other sites where the database resides, and then ensures that each of the other sites is ready to execute the command. When the site ascertains that each of the other sites is ready to execute the command, it provides a signal indicating that the command is to be executed. Responses from each of the other sites indicate whether the command was executed, and sites do not assume that the distributed database has been updated at all sites until the responses so indicate.

Reliance on the database for accurate data is deferred until the database at each of the sites has been updated. As will be appreciated, this hiatus in database operation may be unacceptable in some applications, especially those that may be considered mission critical because interruption may have widespread or severe consequences. For example, where the sites are electrical power distribution control centers that operate continuously and rely on the database for operating information, a pause in database availability may unacceptably affect electrical power distribution.

Accordingly, it is an object of the present invention to provide a novel method of maintaining a distributed database that obviates many of the problems of the prior art methods.

It is another object of the present invention to provide a novel method of maintaining a distributed database in which database availability is not interrupted during database update.

It is yet another object of the present invention to provide a novel method of updating data in a distributed database in which commands are provided to each of the sites and the database is assumed to be updated unless otherwise indicated by responses from the sites.

It is still another object of the present invention to provide a novel method of operating a system that relies on data in a distributed database that resides in sites in the system in which site operation continues whether a command has been executed properly or improperly or not at all, and in which commands are subsequently repeated until executed properly at all sites.

It is a further object of the present invention to provide a novel method of maintaining a distributed database in which commands for acting on data in the database may be selectively classified by their characteristics, and in which commands in a class are executed together to facilitate exploitation of the data in the database.

It is yet a further object of the present invention to provide a novel method of operating a mission critical system, such as an electrical power distribution system, in which data in a distributed database is used at plural command centers for operation thereof, and in which data updates are provided without interrupting system operation.

It is still a further object of the present invention to provide a novel method of updating a distributed database for a mission critical system in which the sites in the system are independently operable and continue to operate even when data in a distributed database is not being updated by one or more of the sites.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 3 is a block diagram of an embodiment of a logical database architecture of the embodiment of FIG. 2.

DESCRIPTION OF PREFERRED EMBODIMENTS

Terminology

Figure 1:
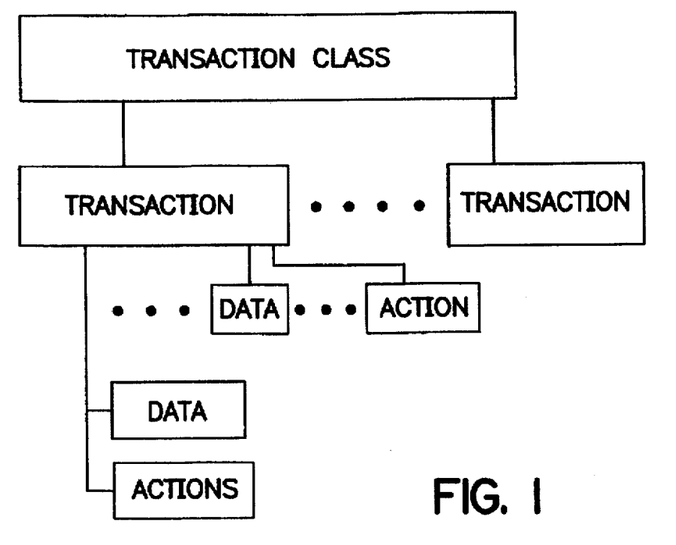
FIG. 1 depicts a hierarchy of the present invention for operating in a distributed database.

In an embodiment of the present invention, a hierarchy for operating in a distributed database is established. With reference to FIG. 1, at the lowest level is the data and separate actions (e.g., commands) for acting on the data. Together, the data and the actions are denoted as transaction objects (hereinafter, simply "transactions"). For example, each transaction may be a collection of several actions on specified data in the distributed database. A group of transactions is denoted a transaction class. Transactions may belong to transaction classes with common characteristics, such as behavior, properties, methods of handling data, commitment, termination, fault recovery procedures, time of execution, data used, etc. A transaction is denoted a global transaction when it operates on shared data that is shared among the sites (as opposed to local data that is site specific and not shared with other sites) and may use resource managers at diverse sites. Global transactions may include operations invoked by application programs, commands issued from the distributed database administration system, operator commands from consoles at the sites, real-time telemetry updates, etc.

System Overview

Figure 2:
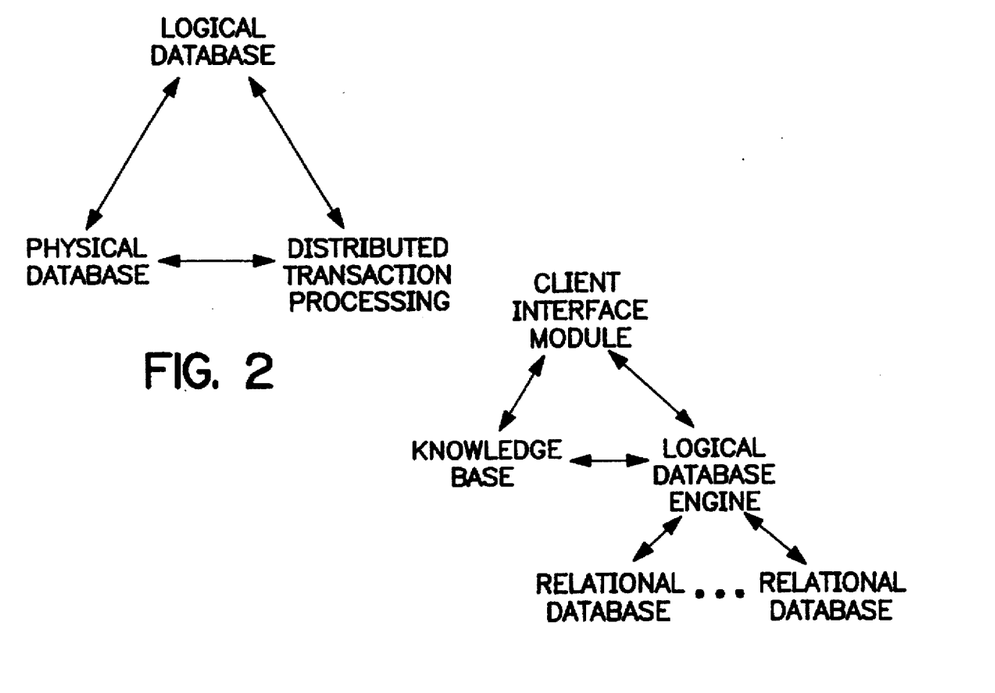
FIG. 2 is a block diagram of an embodiment of the system architecture for the present invention that may be found at each site.

With reference now to FIG. 2, an embodiment of the present invention may use a heterogeneous distributed database architecture in which an intelligent and extensible logical database system is coupled with a high-performance physical database system. The distributed database system may store different data in different types of databases to achieve optimum functionality and performance. The database components may be divided into two general categories: logical database and physical database.

The logical database may include a knowledge base and a source database. The knowledge base provides a mechanism for specifying the database scheme of a particular application, and captures the complex semantics of the application domain and stores such knowledge using knowledge frames. The database scheme in the knowledge base is translated into a corresponding relational scheme called the source database. The source database provides a relational model representation of the database for the particular application and is used to generate the real-time database. The data in the source database may be stored as relational tables.

The physical database may include a real-time database. The source database may be mapped using a data model transformation process to the real-time database, which represents the performance oriented database and stores and manages telemetered data and against which operating changes (e.g., operator commands, application programs, etc.) are issued. The real-time database may be a shared-memory resident and disk resident database and may be organized as a set of special purpose physical structures and access routines that provide performance-oriented access to data.

System Architecture

The architecture may include three major components; a logical database system, a physical database system, and a distributed transaction processing module.

The logical database system provides a conceptual and logical view of the physical database to the user. It also shields the user from the organizational complexity of the physical structures, and provides a portable means of representing real-time data items in the distributed database.

With reference now to FIG. 3, the logical database system may include four components, namely a client interface module, a knowledge base, a logical database engine, and plural relational databases.

The client interface module may provide a full suite of graphical interface tools which allow the user to define, edit, and browse in the database system. The client interface module may include a knowledge base manager which enables the user to manage the knowledge base in the logical database system. A browser allows the user to study the database and to traverse from one transaction to another through foreign connections.

The knowledge base of the logical database system may use a transaction-oriented data model to conceptualize underlying database structures, and may include the knowledge representations of all transactions and transaction classes in the system, their relationship, and their constraints. Transaction-oriented concepts may be used to represent the complex relationships between the various entities in the particular system using the distributed database and real-time system monitoring environment. A hierarchical representation of the entities and relationships may be constructed via generalizations and specializations. This representation supports the transaction class concept and leads to the elimination of redundant information that may be inherited from apparent objects within the hierarchy. Stored with each transaction are definitions describing the attributes and properties of the transaction, as well as procedures and methods for manipulating the transaction. The transaction hierarchy that is defined in the knowledge base describes the elements of the complete system using the distributed database. For example, in an electrical power management distribution system, the knowledge base may encompass data for the power apparatus, computer system devices, data acquisition and control (DAC) equipment, operational and procedure characteristics, and entities with temporal values.

The knowledge base may be defined as a set of frames. Each frame may be an ASCII file providing information in a defined format. Knowledge base software utilities may compile the ASCII files into a binary representation and store them on disk as a binary file. The client interface module and logical database system engine may use the binary representation during normal operation.

The logical database system engine may be a multi-threaded server that uses the knowledge base to provide vendor independent services.

The relational databases may include a logical representation of all transaction instantiations.

Figure 4:
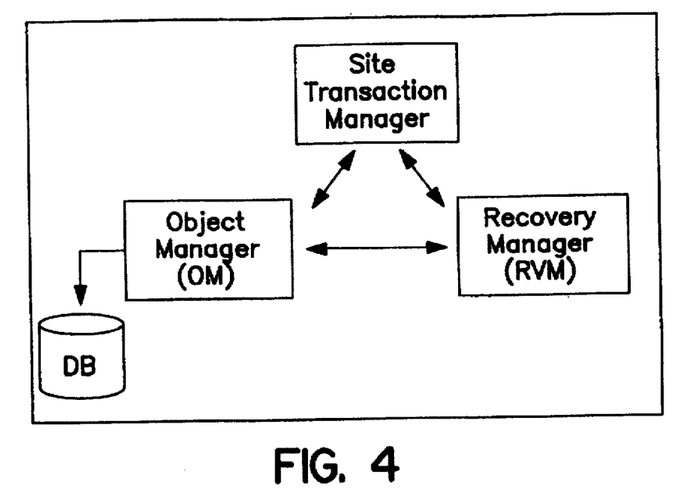
FIG. 4 is a block diagram of an embodiment of a distributed transaction processing (DTP) architecture of the embodiment of FIG. 2.

The reference now to FIG. 4, a distributed transaction processing module, may include three resource managers, namely, a site transaction manager, an object manager, and a recovery manager. Each of these are resource managers that may be further decomposed in a hierarchical structure to various specific resource managers which may be further decomposed into smaller resource managers, and so on.

The object manager encapsulates all forms of access to the data stored in the distributed database. For a particular site in the system, the various forms of access include the management of data in the knowledge base (i.e., frames), management of data in the source database (i.e., relational database), and access to real-time data (i.e., the real-time database).

The recovery manager encapsulates all forms of failure and recovery therefrom in the distributed database at both the local and global levels. The failures may include transaction failure, media failure, node failure, site failure, communication failure, and the associated recovery for each type of failure.

The site transaction manager coordinates the execution of global transactions which operate on shared data that span multiple sites. For the execution of a global transaction, the site transaction manager at each site is responsible for calling on the appropriate local resource manager to carry out work on behalf of the global transaction and for coordinating with site transaction managers at other sites to ensure the orderly execution of the transaction. The site transaction manager at any given site represents the gateway by which the site interacts with the databases at other sites.

The site transaction manager is responsible for global transaction coordination among geographically distributed sites in the database, for controlling the concurrent execution of global transactions to maintain the consistency of the database, and for ensuring that the database contains all the effects or committed (i.e., completely executed) global transactions and none of the effects of aborted global transactions.

The distributed transaction processing module may be the same at each site. Within each site, some of these components may run at a single node, and some may run more than one node.

Figure 5:
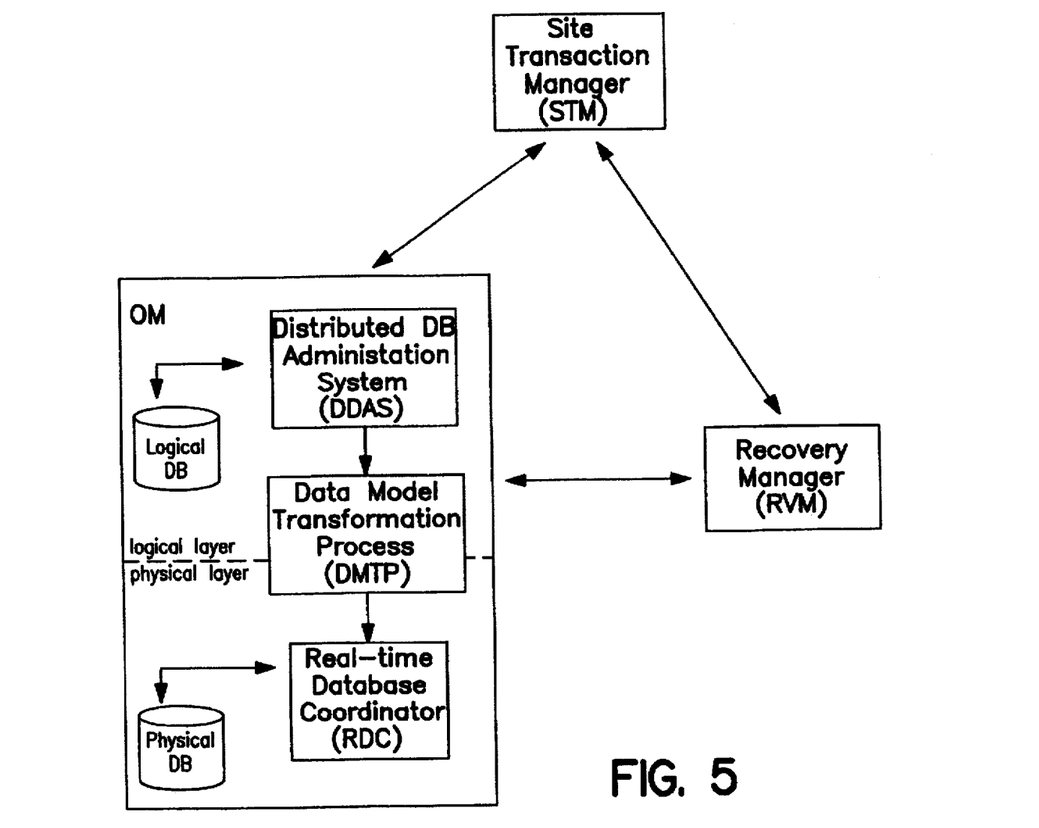
FIG. 5 is a block diagram of an embodiment of an object manager architecture of the DTP embodiment of FIG. 4.

With reference now to FIG. 5, an embodiment of the object manager of the present invention may include two sub-resource managers, namely a distributed database administration system and a database manager.

The distributed database administration system may include various sub-resource managers, such as;

Knowledge Base Manager: This resource manager provides services to manage (edit and modify) the frame representations of the database schema.

Edit Session: This resource manager provides services to manage objects in the source database. An SQL-like interface is provided and is used to insert, update, and delete objects in the source database.

Database Security Manager: This resource manager provides security services for database administration activities, and for user and session authentication.

Browser: This resource manager provides a graphical user interface for browsing the data in the source database.

Arithmetic Code Generation: This resource manager provides services for specifying calculations on data—such calculations are performed on data and stored back in the source database.

Utility Manager: This resource manager is used to provide various utility services for the knowledge base and source database. These utilities include batch input, export and import of external data (files), etc.

OID Manager: This resource manager is used to provide a global naming service for transactions in the distributed system. Global naming autonomy is preserved and the OIDM resolves naming conflicts on transactions across sites.

GDD Manager: This resource manager provides a global data directory service. It provides location and distribution information for transactions, and serves as the basis for distribution of transactions.

The real-time database coordinator may include:

Virtual Site Transaction Processor: This resource manager provides the interface from the real-time database of a given site to the site transaction manager of that site, for the processing of global transactions.

Real-time Database Manager: This resource manager provides services for synchronizing the real-time databases distributed across various nodes of a given site.

Update Queue Transmitter: This resource manager provides services for distributing local update transactions to various nodes on the local area network of a given site.

DB ACCESS: This resource manager provides access routines for accessing the real-time database at each node of a given site.

Figure 6:
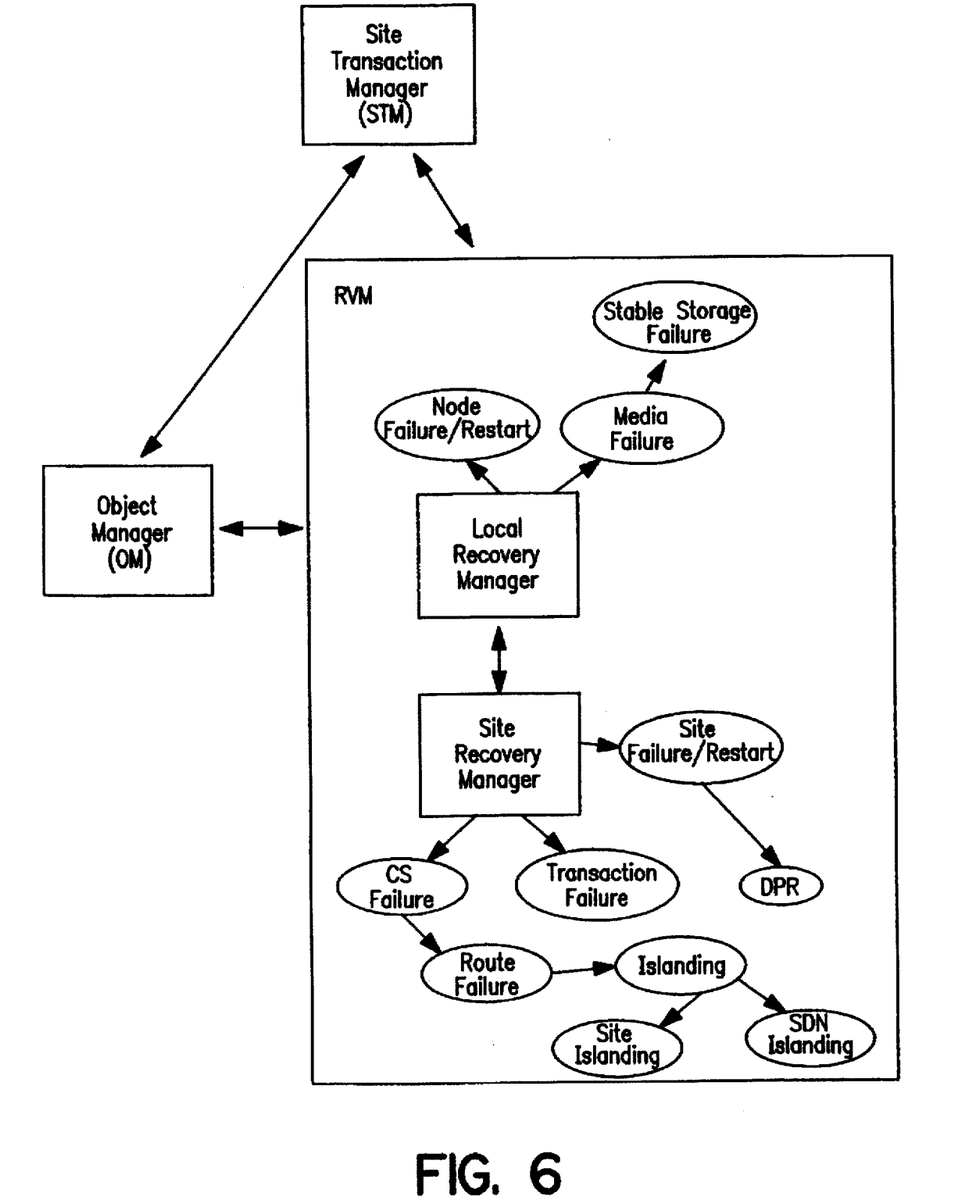
FIG. 6 is a block diagram of an embodiment of a recovery manager architecture of the DTP embodiment of FIG. 4.

With reference now to FIG. 6, the recovery manager may include various sub-resource managers, such as;

Node Failure/Restart: This resource manager is responsible for the recovery from the failure of any of the nodes on the local area network (LAN). This includes LAN failure/recovery, work station (WS) failure/recovery and administrative node (AN) failure/recovery.

Media Failure: This resource manager is responsible for the recovery from media failure. More specifically, it must deal with recovery from stable media failure (e.g., when a snapshot or the transaction log in stable storage is corrupted or lost).

Site Failure/Restart: This resource manager is responsible for the recovery from the overall failure of a site. Disaster Prevention Recovery (DPR) is a special case of site failure/restart.

DPR: This resource manager is responsible for migrating the responsibilities of a site to another site during disaster prevention recovery as a result of site failure.

CS Failure: This resource manager is responsible for the recovery from the failure of the Communication Subsystem (CS). The CS failure can be categorized as route failure or islanding.

Route Failure: This resource manager is responsible for recovery from the failure of a route from a given site to another site. A special case of route failure is Islanding.

Islanding: This resource manager is responsible for recovery when one or more sites or semi-detached nodes (SDN) are isolated from the other sites on the network. Islanding occurs when this site or group of sites has suffered route failures to all other sites, islanding can be categorized as site islanding or SDN islanding.

Transaction Failure: This resource manager is responsible for the recovery from the failure of global transactions.

Figure 7:
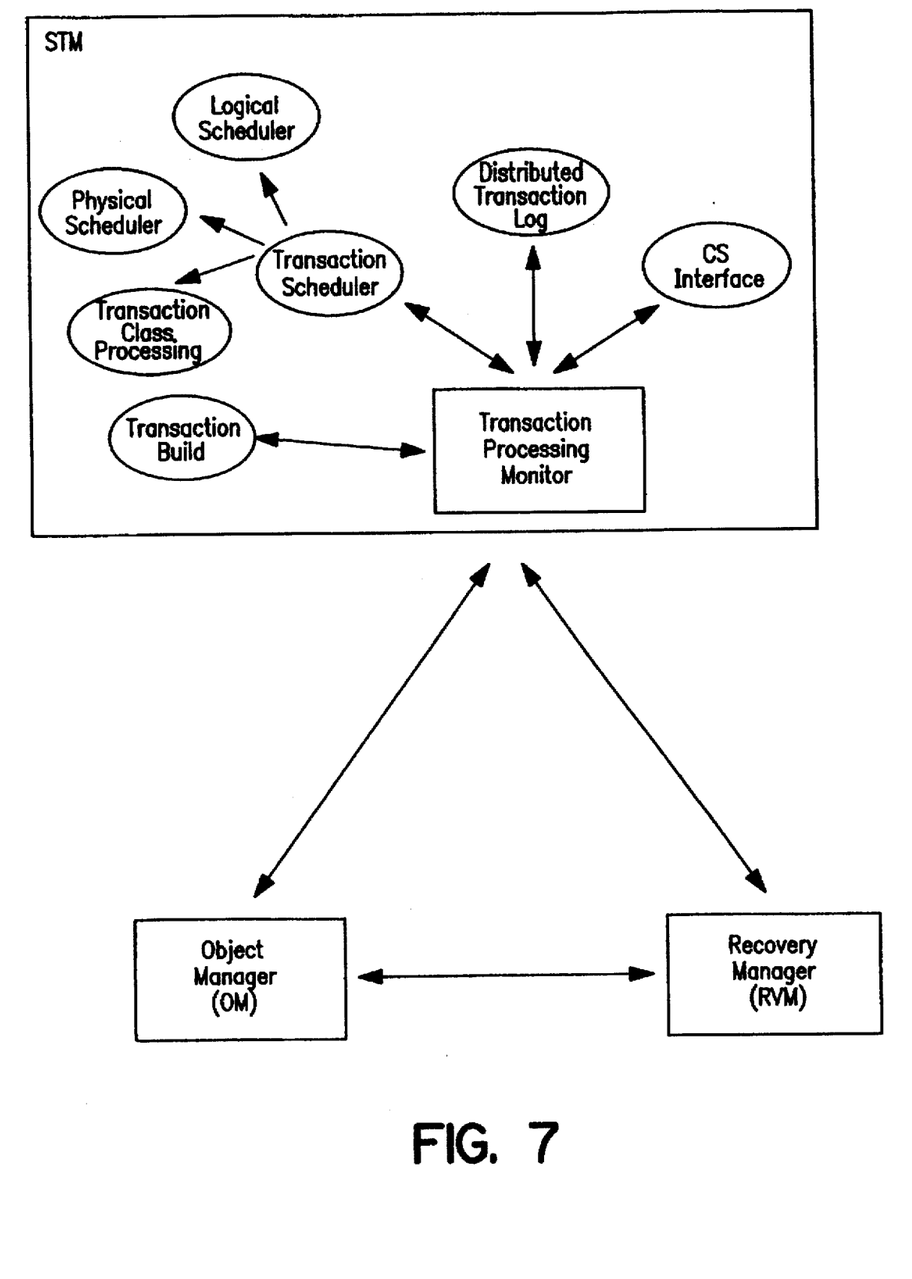
FIG. 7 is a block diagram of an embodiment of a site transaction manager architecture of the embodiment of FIG. 4.

With reference now to FIG. 7, the Site Transaction Manager may include sub-resource managers, such as;

Distributed Transaction Log: This resource manager provides transaction logging services for global transactions which operate on shared data across multiple sites.

Communication Subsystem Interface: This resource manager provides communication services between sites (standards such as those proposed for OSF/DCE would apply here).

Transaction Scheduler: This resource manager provides scheduling services (queues, etc.) for global transactions. This resource manager is further decomposed into two other resource managers; one for scheduling logical-level transactions and the other for scheduling physical-level transactions.

Transaction Class Processing: This resource manager provides services which implement the range of different transaction and commitment protocols corresponding to different types of transaction classes.

Transaction Build: This resource manager provides services which implement the formatting of global transactions to include distribution-related structures.

In a preferred embodiment of the invention, each site is capable of independently and autonomously defining and using local and shared transactions. Desirably, sites independently define data and share data only to the extent needed. Location grandparent is supported where data access to shared transactions appears to be local and transparent to the user. Access to shared data is controlled by a set of permissions defined on a per site basis. A global data directory (GDD) serves as the key mechanism for controlling the distribution and modification of shared data.

Each site is also independently and autonomously configurable as a separate system. Configurable attributes are supported on a site basis. This enables each site to be configured independently from other sites and as a result, distributed site share the same object, but present them differently. This mechanism is implemented through the GDD which support site autonomy through the distribution of authorizations, and site ownership. In essence, each site, while operating as part of a globally distributed system, operates as an independent and discrete system.

The system is preferably non-blocking. That is, each site is allowed to process read transactions on shared data in an independent manner without coordinating with any of the other sites that share the data. Transactions which write to shared data use an "Aggressive Reverse One Phase Commit Protocol" to ensure that the failure of any given site that share data does not cause blocking of data updates. Each site independently performs the commit phase in the one phase commit after the transaction is issued by the transaction coordinator. This allows for high data availability even in the event of site failure.

With further reference to the preferred embodiment, the database administration system incorporates a knowledge base mechanism and a data class mechanism. The knowledge base mechanism provides a transaction oriented view of the data. The data class mechanism provides facilities to define the behavior of distributed transactions.

Dirty read is allowed across sites.

Inconsistent update is temporarily allowed.

Application programs use transactions as a basic mechanism to access and maintain data. Transactions are categorized as non real-time, and real-time. The non real-time transactions are issued through the database administration system and are processed against the logical database. The real-time transactions are received and processed against the performance-oriented database.

Logical transactions are issued through the distributed database administration system (DDAS) and operate against the source (relational) database. Logical transactions include the following:

Insert: this operation is responsible for inserting a new shared transaction at a given site (the defining site) and propagating this insert to all sharing sites.

Update: this operation is responsible for updating a shared transaction and propagating this update to all sites which share the transaction.

Delete: this operation is responsible for deleting a shared transaction from all sites which share the transaction.

Share: this operation is responsible for inserting an existing transaction at a new sharing site.

Unshare: this operation is responsible for removing an existing shared transaction from a given sharing site.

Note that of the above transactions, insert, delete, share and unshare are issued from the defining site whereas update can be issued from any site sharing the transaction.

Physical Transactions are issued via operator consoles and applications programs and are processed against the real-time database. Physical transactions include the following:

Read: this operation is responsible for reading data from the real-time database at any given node of a site. This operation is local to the node and is not distributed.

Update: This operation is responsible for updating a shared transaction in the real-time database and propagating the update to all sites which share the transaction.

Each global transaction can modify/delete transactions which have the same owner, same defining site, same coordinating site, and same sharing site.

Transactions have properties and behavior. Transactions having common properties and behavior are grouped together and constitute a transaction class. Transaction properties are:

a. Identity: Transaction objects are identified by a transaction identifier.

b. Classification (Transaction class): each transaction has a transaction class identifier which identifies the transaction class to which the transaction object belong, the transaction class defines the transaction behavior, commitment, termination and recovery protocol. Transaction classes are a mechanism used to encapsulate transaction characteristics, i.e., the properties and the run-time behavior of transactions. Different transaction classes are defined to handle the various combinations of properties and behaviors exhibited by different types of transactions on different types of data.

c. Interdependency level: each transaction can specify a dependency between itself and other transactions—this dependency is used to specify other transactions whose execution must proceed or follow the given transaction. Only a very simple form of interdependency (e.g., single level of interdependency) is provided in order to avoid deadlock scenarios.

d. Priority: each transaction object is assigned a priority which may be used to schedule the transaction, i.e., the scheduling of higher priority transactions can preempt lower priority transactions.

e. Time Stamp: each transaction is assigned a time stamp which indicates the time the transaction was initiated.

f. Operation: read, write, update, delete, etc., and g. Transaction Behavior, discussed below.

In the preferred embodiment, each transaction has a run time behavior which involves the following sites:

Originator: Site in which transaction is initiated. Any site can be the originator of a transaction.

Coordinator: Site which is responsible for submission and coordination of the transaction. Only the owner site (either defining site or coordinating site of the transaction, as defined in the GDD) can be the coordinator of the transaction.

Participant: Sites which receive a (sub) transaction and execute the transaction against their database.

Each transaction has the following run-time behavior:

Transaction State: the state of the transaction during the scheduling and execution of the transaction.

Transaction Execution Sequence: the sequence of states that define the execution of a transaction.

Transaction Termination Protocol: the protocol which governs the termination (e.g., commit, partial commit, abort) of a transaction.

Transaction Life Cycle: the run-time behavior of the transaction at the transaction originator, at the transaction coordinator, and at each of the transaction participants.

Concurrency Control: Concurrency Control is used to serialized the execution of concurrent global transactions. Global concurrency control is achieved by using replicated copies of transactions and a distributed read-centralized write approach. This implies that (1) dirty read is allowed temporarily, which means global read lock are not needed, and (2) global write lock is not needed. An update strategy based on the ownership of the transaction is responsible for synchronizing concurrent updates of the transaction. That is, all the requests for modifying/deleting a transaction must be sent to coordinating site of the transaction respectively, only the owner can submit global transactions to modify/delete a transaction.

This concurrency control approach ensures (1) high performance and (2) simplified the global concurrency control of site transaction manager.

A commitment protocol, denoted the "Aggressive Reverse One Phase Commitment Protocol (AR1PC)", may be used for committing the global transactions. AR1PC takes an aggressive (or optimistic) approach, in the sense that it goes ahead and commits sub-transactions before it knows that all the sub-transactions will commit successfully. AR1PC follows a "reverse" strategy for commitment as compared to the conventional two phase commit protocol in the sense that with two phase commit the user first makes sure that everything is OK and then the sub-transactions are committed, whereas with AR1PC one commits (or attempts to commit) the sub-transactions and then makes sure that everything is OK—i.e., shoot first and ask questions later. If everything is not OK (not all the sub-transactions committed), then either the transaction is undone using compensation, or committed using re-execution. Assuming that all sub-transactions commit successfully, AR1PC will result in one phase where all the sub-transactions are submitted, committed, and acknowledged.

By way of example, the following "conversation" may take place between a transaction coordinator and the transaction participants.

Transaction Coordinator:
  Records Transaction in log.
  Sends transaction to all participants (including coordinator) and activate time-out.
Transaction Participants:
  Receive transaction and record in log.
  Execute transaction (no wait).
  IF transaction commits,
    THEN log commit status and send commit status to coordinator,
  ELSE IF transaction error,
    THEN log error status and send error status to coordinator.
Transaction Coordinator:
  Wait for commit/error status from all participants or time-out at coordinator.
  IF all participants respond,
    THEN IF all participants return OK commit status,
      THEN mark log as global (fully) commit, write transaction as complete,
    ELSE IF some participants return no commit or error status,
      THEN mark log as partial commit, mark sites with commit status, no-commit status or error status, write transaction as complete (error handling goes to recovery),
  ELSE IF time-out,
    THEN mark log as partial commit, mark sites with commit status, no-commit status or error status, write transaction as complete (error handling goes to recovery).

The protocol described above has the following characteristics:

Non-blocking: the protocol is non-blocking since neither the transaction coordinator nor any transaction participant go into a wait state when carrying out the action. The only wait, the transaction coordinator waiting for commit status from all participants, is not blocking due to the reverse commit.

Aggressive: the protocol assumes an optimistic or aggressive approach in the sense that each site independently commits without waiting to check if all sites are waiting to commit.

One phase: the transaction execution is carried out in a single phase. In the two phase commit protocol, the transaction coordinator first ensures that all participants are ready to commit and then requests the participants to commit. In contrast, in AR1PC, there is no prepared to commit state (a wait state), and the transaction coordinator directly requests the participants to commit in the first phase.

Reverse commit: the protocol uses a reverse commit strategy to determine the commit status of the transaction. Unlike the two phase commit protocol where the transaction coordinator ensures that all sites are ready to commit before the actual commit, AR1PC proceeds with the actual commit and then checks if all sites committed or not. If a participant has not committed due to some abnormal condition, a mechanism is provided for re-executing the transaction at that participant when the abnormal condition that blocks the commit of the transaction is corrected.

Figure 8:
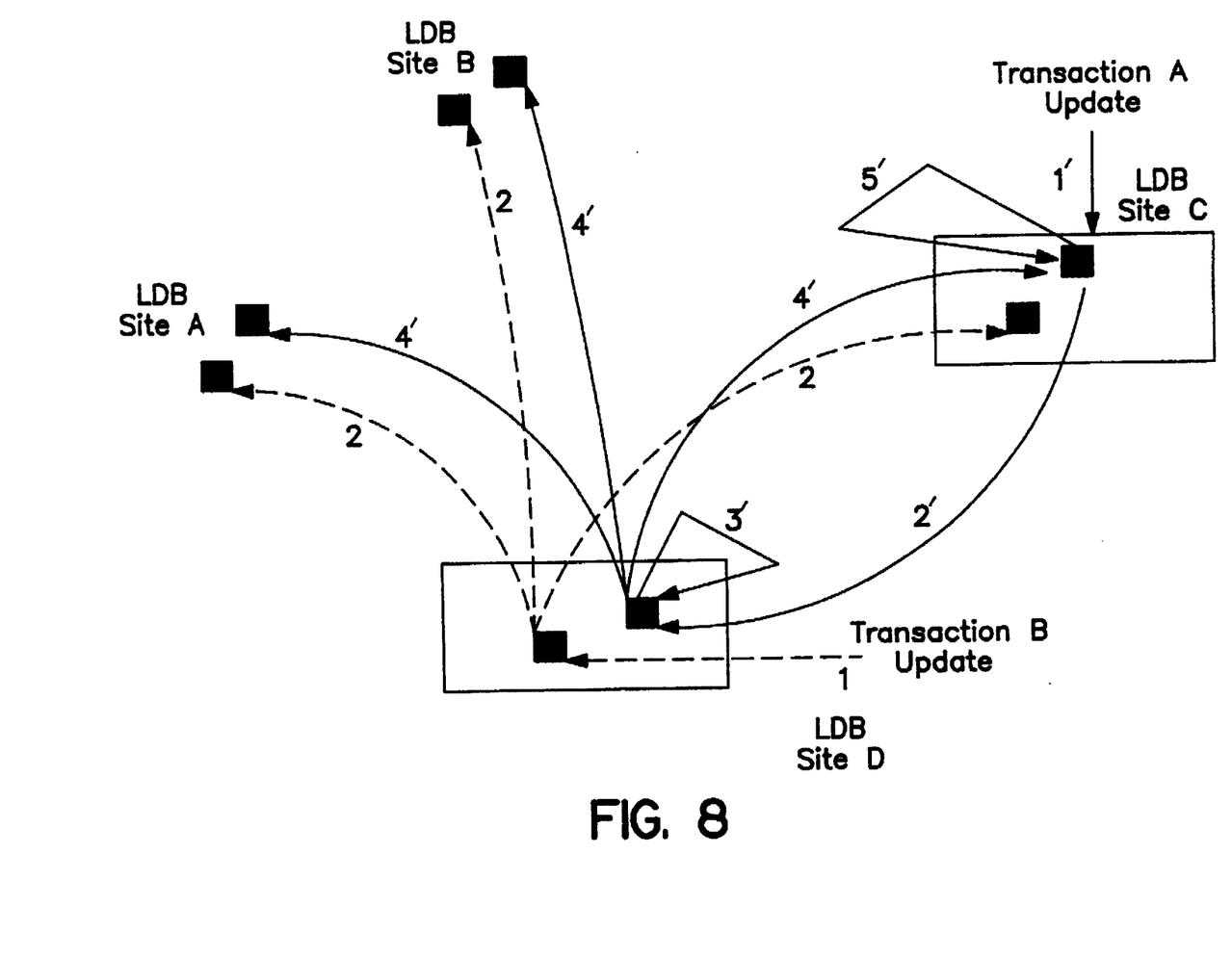
FIGS. 8–12 are illustrations of operation of embodiments of database update in the present invention.

By way of example and with reference to FIGS. 8 through 12, the present invention may operate in various modes. With reference to FIG. 8, when an transaction B is updated at local database (LDB) site D, as indicated by arrow 1, and where site D is the transaction coordinator, site D immediately provides updates to the other sites in the system. Where an transaction A is updated and provided to site C, where site C is the owner of transaction A but not the transaction coordinator for transaction A, site C provides transaction A to the transaction coordinator at site D as indicated by arrow 2', and site D then updates its database as indicated by arrow 3', then provides updates to other sites as indicated by arrow 4'. Upon receipt at site C, site C updates itself as indicated by arrow 5'.

Figure 9:
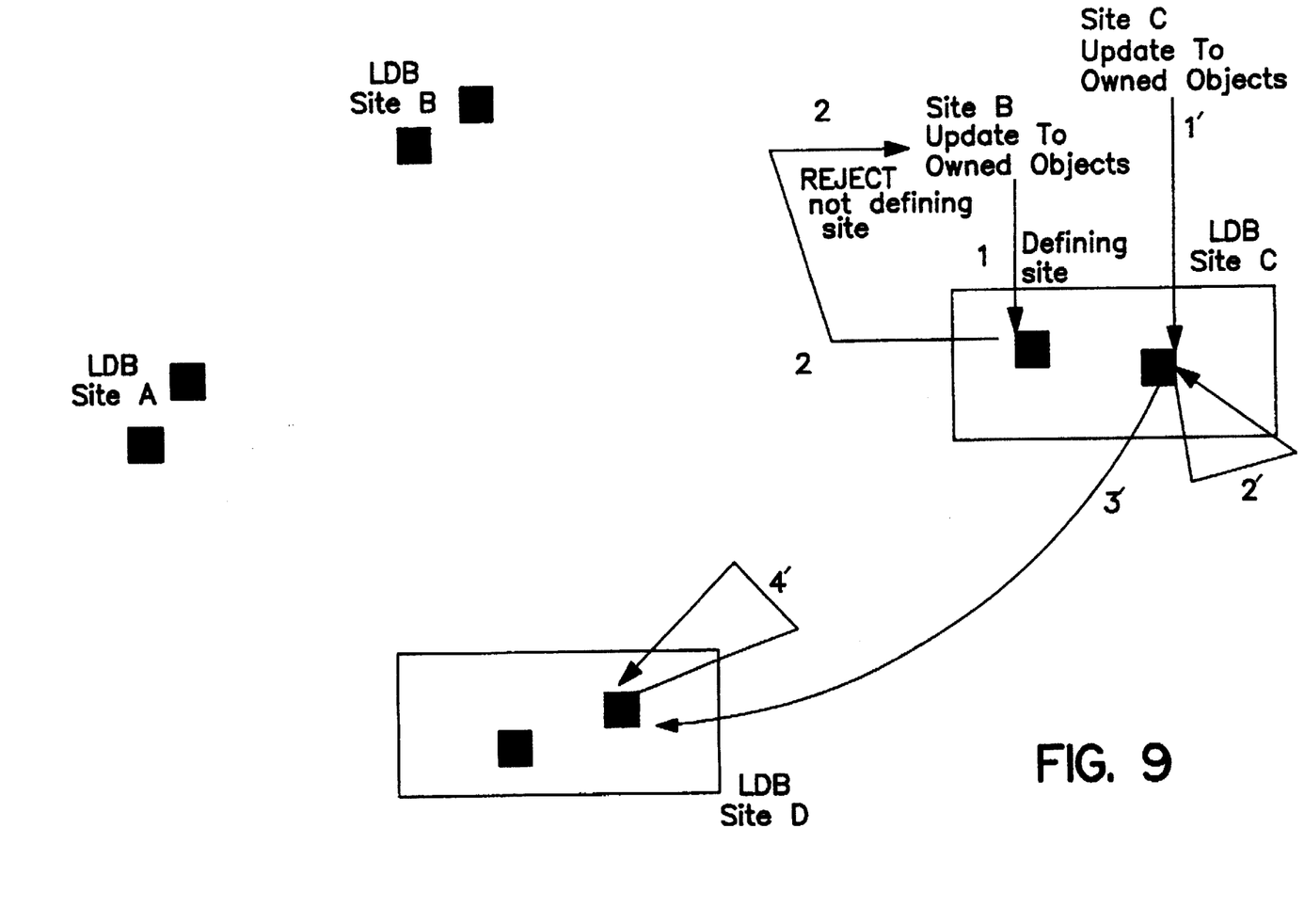

With reference now to FIG. 9, where an update is provided to site C at arrow 1, and the update is to an transaction owned by site B, the transaction will be rejected as indicated by arrow 2 because site C is not a defining site. An update provided to site C for an transaction owned by site C as indicated by arrow 1' would be provided to its own database as indicated by arrow 2', and to other databases as indicated by arrows 3' and 4'.

Figure 10:
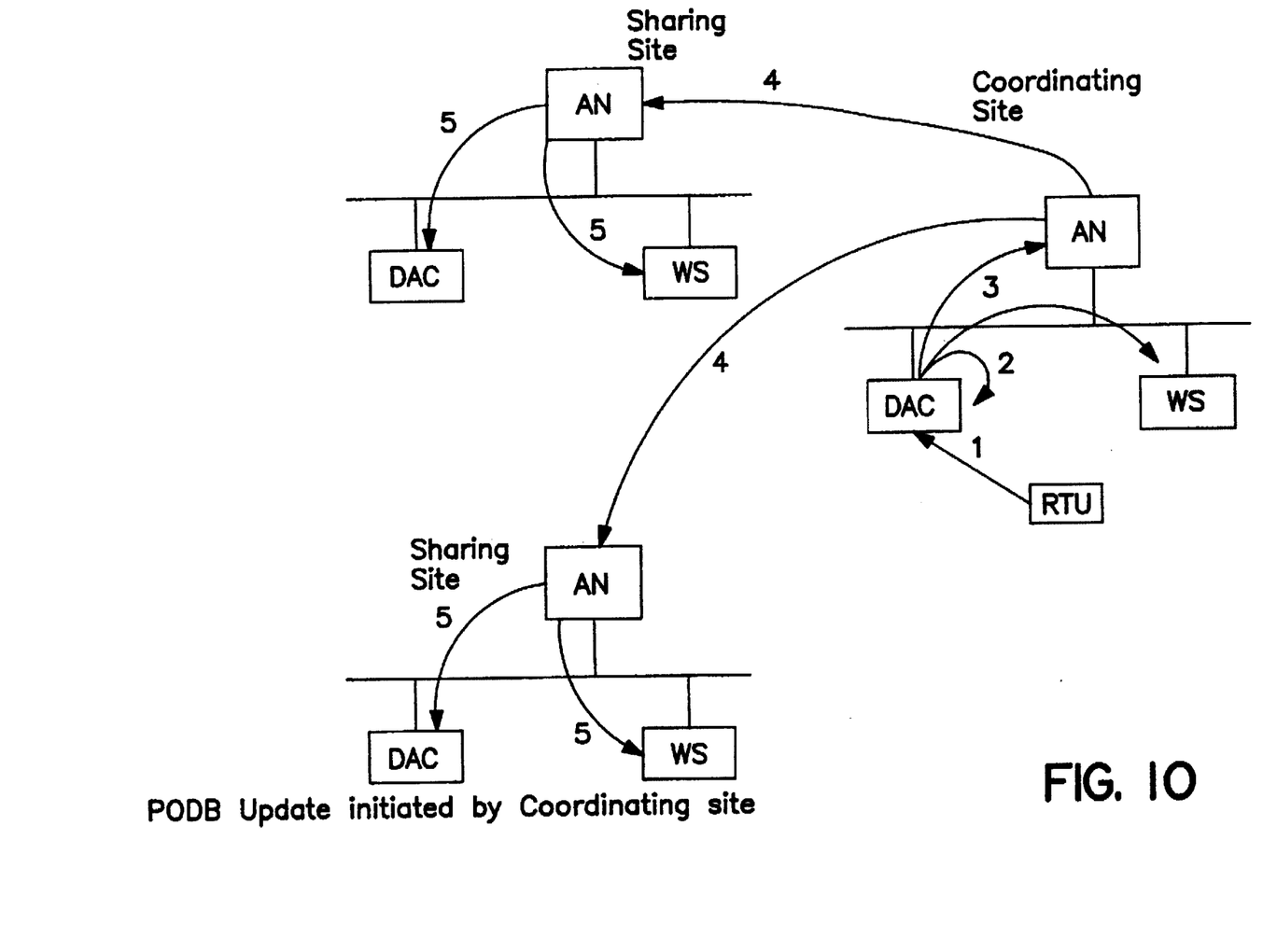
Figure 11:
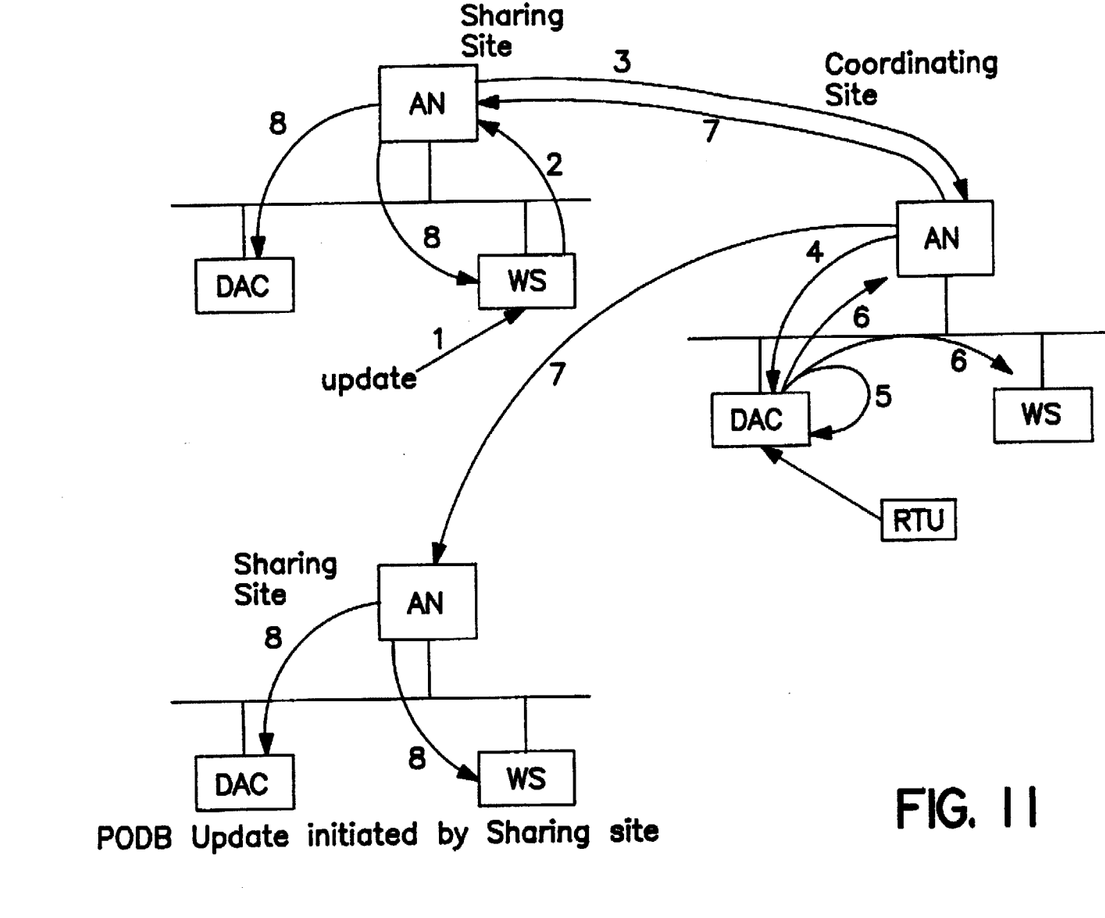
Figure 12:
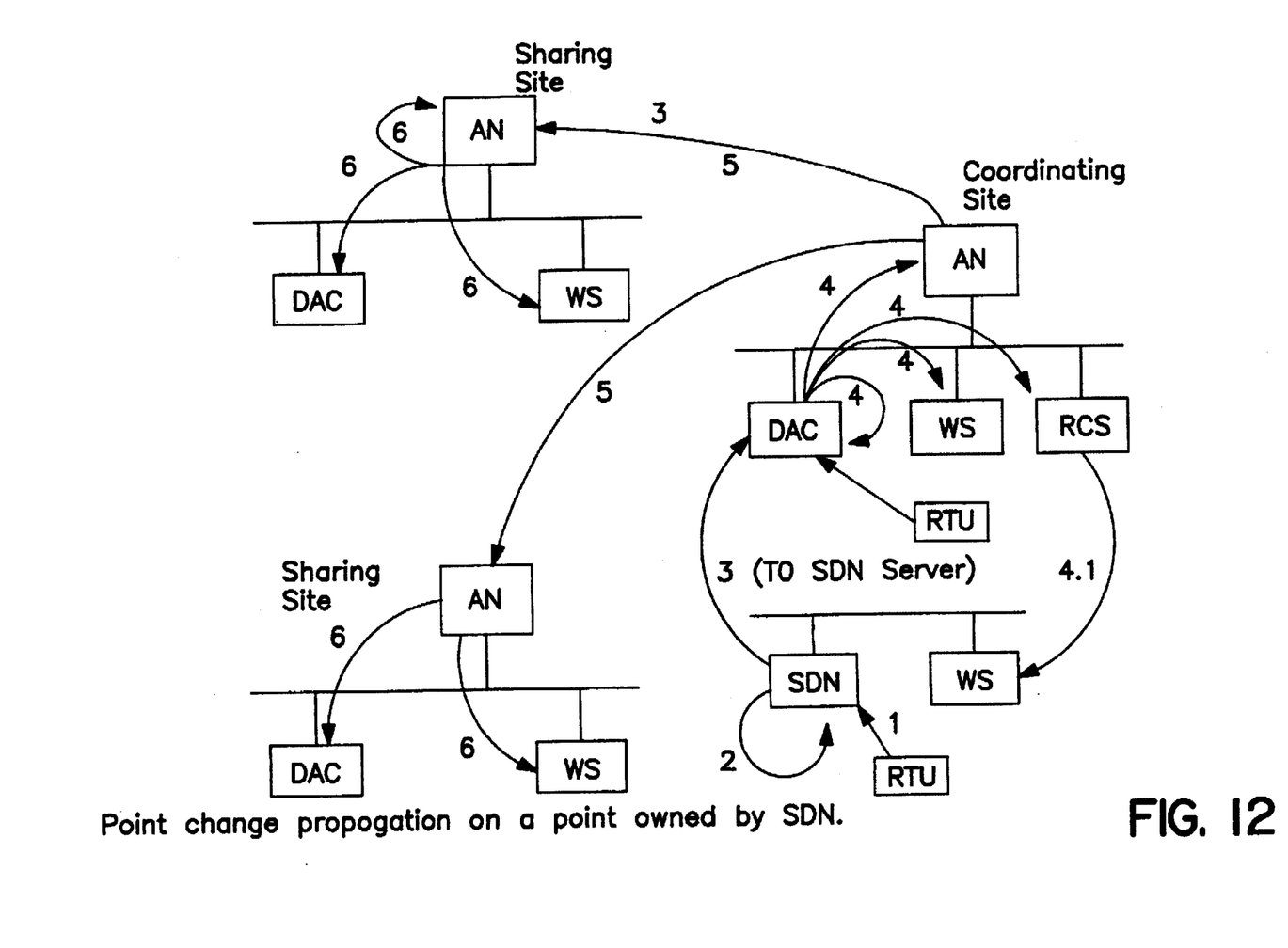

With reference now to FIGS. 10–12, where a public transaction is updated initially as indicated by arrow 1, the route of the update may be traced by following the numerically numbered arrows (where DAC is a data acquisitioning control node, WS is a work station, and AN is an administrative node). The figures illustrate a public transaction database update initiated by the coordinating site (FIG. 10), by the sharing site FIG. 11), and from a point at a semidetached node (SDN in FIG. 12).

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of updating data in a distributed database residing at each of plural sites, each of the plural sites being independently operable and using the data in the distributed database for the operation thereof, the method comprising the steps of:

(a) providing from a transaction coordinator to one or more of the plural sites a transaction for acting on the data in the distributed database;

(b) attempting at each of the plural sites to which a transaction is provided to execute the provided transaction as soon as the transaction is received;

(c) using at each of the plural sites the distributed database whether or not the transaction was carried out correctly or not at all by any of the plural sites;

(d) operating the transaction coordinator as if the transaction had been carried out correctly at each of the plural sites to which the transaction was provided until a contrary indication has been received by the transaction coordinator;

(e) providing to the transaction coordinator a fault indication from any of the plural sites to which the transaction was provided when the transaction was not executed correctly or at all.

2. The method of claim 1 further comprising the step of:

(f) again providing in response to receipt of a fault indication from any one or more of the plural sites the transaction from the transaction coordinator to the one or more of the plural sites from which the fault indication was received.

3. The method of claim 1 further comprising the step of designating an owner for the transaction, the transaction owner being one of the plural sites, and wherein the transaction coordinator is the owner of the transaction provided therefrom.

4. The method of claim 1 further comprising the steps of:

defining plural ones of the transaction, each acting differently on the data in the distributed database at one or more of the sites;

classifying the plural transactions into plural classes, each of the transaction classes having common characteristics; and acting on the data by attempting to execute the plural transactions in one of the plural transaction classes.

5. A method of maintaining a distributed database at plural independently operable sites each of which independently use the entire distributed database for its operation, the method comprising the steps of:

(a) defining plural transactions, each of the transactions comprising the identification of a transaction coordinator and one or more actions which act on the data in the distributed database at one or more of the plural sites;

(b) receiving at the one of the plural sites identified as a transaction coordinator a transactions provided by one of the plural sites;

(c) providing from the transaction coordinator the received transaction to each of the other of the plural sites;

(d) attempting at the other plural sites to which the transaction is provided to execute the provided transaction;

(e) transmitting from each of the other plural sites to which the transaction was provided a commit status report to the transaction coordinator indicating whether or not the transaction was executed or executed without error;

(f) continuing at each of the plural sites to use the distributed database regardless of whether or not the transaction was executed or executed without error; and (g) storing at the transaction coordinator (i) the identities of the other plural sites to which the transaction was provided, (ii) the identities of the other plural sites from which commit status reports were not received, and (iii) the commit status reports.

6. The method of claim 5 further comprising the step of:

(h) again providing in response to the stored commit status reports the transaction from the transaction coordinator to a selected one or more of the other plural sites.

7. The method of claim 5 further wherein the transaction defines the owner of the transaction; and wherein the owner of the transaction is defined as the transaction coordinator.

8. The method of claim 5 further comprising the step of designating an owner for each of the transactions, the owner being one of the plural sites.

9. The method of claim 8 further comprising the step of limiting the ability to delete one of the transactions from the distributed database to the owner of the transaction to be deleted.

10. The method of claim 5 further comprising the step of selectively controlling the ability of the plural sites to execute received ones of the plural transactions.

11. The method of claim 5 further comprising the step of sorting the plural transactions into classes with common properties and behavior.

12. The method of claim 11 further comprising the step of accessing the distributed database from a site with reference to a transaction class.

13. The method of claim 11 further comprising the step of acting on data in the distributed database with reference to a transaction class.

14. The method of claim 5 wherein the transaction defines an error recovery procedure.

15. The method of claim 5 wherein the plural sites comprise control centers for an electrical power distribution system.

16. A method of operating a distributed database at plural independently operable sites, the method comprising the steps of:

(a) providing a local database at each of the plural sites, each local database including local data that is not shared with others of the plural sites and shared data that is shared with others of the plural sites;

(b) defining plural transactions comprising one or more actions which act on the shared data in the distributed database at one or more of the plural sites;

(c) selectively classifying the plural transactions into plural classes, each of the transaction classes having common characteristics; and (d) acting on the shared data by attempting to execute the transactions in one of the transaction classes.

17. The method of claim 16 further comprising the step of controlling access to shared data at each of the plural sites with a global data directory that defines ownership and permissive use of the shared data that may be provided to each of the plural sites.

18. The method of claim 16 wherein the step of acting on the shared data is carried out at the plural sites immediately upon receipt of the transactions in the one transaction class.

19. The method of claim 18 further comprising the step of transmitting a commit status report from each of the plural sites, the commit status report indicating whether the received transactions were executed without error, or executed with error, or not executed.

20. The method of claim 19 further comprising the step of using the distributed database at the plural sites regardless of whether the received transactions were executed without error, or executed with error, or not executed.

21. The method of claim 18 further comprising the steps of;

assembling at a one of the plural sites that is a transaction coordinator the commit status reports from the plural sites and the identities of plural sites where the transactions where to be executed but from which commit status reports were not received; and storing the commit status of each of the plural sites for the received transactions.

22. The method of claim 16 where the plural sites comprise control centers for an electrical power distribution system.

23. A method of maintaining consistency of data at each of plural sites in a distributed database where each of the plural sites are independently operable and use the data in the distributed database for operation thereof, the method comprising the steps of:

(a) defining a transaction for acting on the data in the distributed database;

(b) providing the transaction to the plural sites for execution;

(c) attempting to execute the transaction at each of the plural sites as soon as the transaction is received;

(d) reporting from each of the plural sites whether the transaction was executed without error, or executed with error, or not executed;

(e) using the distributed database at the plural sites regardless of whether the transaction was executed without error, or executed with error, or not executed; and (f) attempting to correct the data in the distributed database responsive to the reports from the plural sites.

24. The method of claim 23 wherein the transaction is owned by one of the plural sites that is designated a transaction coordinator, and further comprising the step of storing at the transaction coordinator the reports from the sites, wherein the step of attempting to correct the data is responsive to the stored reports.

25. A method of updating data at plural electrical power distribution control centers that are connected to a distributed database, each of the plural control centers being independently operable and using the data in the distributed database for operation thereof, the method comprising the steps of:

(a) providing a transaction for acting on the data in the distributed database from a control center coordinator to the plural control centers;

(b) attempting to execute the transaction at each of the plural control centers as soon as the transaction is received;

(c) using the distributed database at the plural control centers whether the transaction was carried out correctly or not, or not at all;

(d) operating the control center coordinator as if the transaction had been carried out correctly at the plural control centers, until a contrary indication is received;

(e) indicating from the plural control centers to the control center coordinator when the transaction was not executed correctly, or not at all.

26. The method of claim 25 further comprising the step of attempting to re-execute the transaction at the control centers where the transaction was carried out incorrectly or not at all responsive to the indication from the plural control centers.

27. The method of claim 26 further comprising the steps of:

defining plural ones of the transaction, each acting differently on the data in the distributed database at one or more of the plural control centers; and classifying the plural transactions into plural classes, each of the transaction classes having common characteristics.

28. A method of maintaining consistency of data at each of plural control centers in an electrical distribution system where each of the plural control centers are connected to a distributed database and use data in the distributed database for operation thereof, the method comprising the steps of:

(a) defining a transaction for acting on the distributed database, the transaction definition including an owner of the transaction and the identity of the control centers that share the transaction;

(b) providing the transaction to the identified control centers for execution;

(c) attempting to execute the transaction at the identified control centers upon receipt when,
the transaction is insertion of the transaction, deletion of the transaction, deletion of identified control centers, and only when the transaction is provided from the transaction owner,
the transaction is an update of the transaction and the transaction is provided from any of the identified control centers;

(d) reporting from each of the identified control centers whether the transaction was executed without error, or executed with error, or not executed;

(e) using the distributed database at the identified control centers regardless of whether the transaction was executed without error, or executed with error, or not executed.

* * * * *

UNITED STATES PATENT AND TRADEMARK OFFICE
CERTIFICATE OF CORRECTION

PATENT NO. : 5,729,733
DATED : March 17, 1998
INVENTOR(S) : Jamshid Sharif-Askary It is certified that error appears in the above-identified patent and that said Letters Patent is hereby corrected as shown below:

Title page, item [54] and col. 1, the Title should read as follows:
-- METHOD OF OPERATING A DISTRIBUTED DATABASE BASED ON

OBJECT OWNERSHIP AND TRANSACTION CLASSIFICATION

UTILIZING AN AGGRESSIVE REVERSE ONE PHASE COMMIT PROTOCOL --

Signed and Sealed this

Second Day of June, 1998

BRUCE LEHMAN

*Attest:*

*Attesting Officer*  *Commissioner of Patents and Trademarks*